United States Patent [19]

Cekoric et al.

[11] 4,131,662

[45] Dec. 26, 1978

[54] TALC-BASED EXTERNAL MOLD RELEASE AGENT FOR POLYURETHANE FOAMS

[75] Inventors: Mark E. Cekoric, North Versailles; Robert M. Loring; William A. Ludwico, both of Library, all of Pa.

[73] Assignee: Mobay Chemical Corporation, Pittsburgh, Pa.

[21] Appl. No.: 866,449

[22] Filed: Jan. 3, 1978

[51] Int. Cl.$^2$ .................. C08G 18/14; B29C 1/04; C09K 3/00
[52] U.S. Cl. ...................... 264/51; 252/182; 252/428; 252/431 R; 264/338; 264/DIG. 14; 264/DIG. 77; 521/51; 521/126; 521/127; 260/18 TN
[58] Field of Search ............... 252/182, 428, 431 R; 264/DIG. 14, DIG. 77, 51, 338; 260/2.5 AZ, 2.5 BD

[56] References Cited

U.S. PATENT DOCUMENTS

| | | | |
|---|---|---|---|
| 3,468,991 | 9/1969 | Krug | 264/338 |
| 3,474,166 | 10/1969 | Babcock | 264/338 |
| 3,694,530 | 9/1972 | Wolfe | 264/338 |
| 3,952,079 | 4/1976 | Özelli et al. | 264/338 |
| 4,028,120 | 6/1977 | Emond | 264/338 |
| 4,038,088 | 7/1977 | White et al. | 264/338 |

*Primary Examiner*—H.S. Cockeram
*Attorney, Agent, or Firm*—Gene Harsh; Joseph C. Gil

[57] ABSTRACT

The instant invention is directed to novel mold release agents for polyurethane resins and to the use thereof, particularly in the closed mold forming of polyurethane foams. The mold release agents disclosed herein are applied to the surface of the mold prior to molding and broadly comprise talc dispersed in an emulsion of water and an organic solvent.

6 Claims, No Drawings

TALC-BASED EXTERNAL MOLD RELEASE AGENT FOR POLYURETHANE FOAMS

BACKGROUND OF THE INVENTION

Polyurethane foams having an impervious outer skin and a cellular core are known and are generally obtained by foaming in a closed mold. Such polyurethane foams are eminently suitable for the mass production of light weight structures, such as for example, in the furniture, motor vehicle, and housing industries.

These polyurethane moldings are generally produced by introducing a foamable reaction mixture comprising a polyisocyanate, a compound containing at least two hydrogen atoms reactive with isocyanates and additives, into a closed heatable mold in which the foam expands and solidifies under high compression. The foamed material fills the mold and exactly reproduces the inner surface thereof.

It is generally preferred to use molds made of a material of extremely high thermal capacity and equally high thermoconductivity such as metal. It is also possible however to use molds made of other materials such as various plastics, glass or wood.

In order to prevent the foamed molding from adhering to the surface of the mold during mold release, the mold surface is generally provided with a release agent. Waxes, soaps and various silicones are commonly used as mold release agents for polyurethane systems. These mold release agents apparently form a thin film between the surface of the mold and the foamed molding, which theoretically should not adhere to either the mold or the molding and thus should enable the molding to be readily removed from the mold. Unfortunately, these types of release agents possess several disadvantages including the formation of residues of release agent on the mold surface and the formation of a thin coating of release agent on the surface of the molded product to which conventional lacquer systems do not adhere. Finally, to date, the external release agents used do not generally prevent a certain amount of delamination of the integral skin from the foam core upon removal from the mold.

In an effort to overcome these problems, the art has developed the use of talc powder as an external release agent. As discussed in U.S. patent application Serial Number 690,447, filed May 27, 1976, talc powder may be applied to a mold surface by merely dusting the powder onto the mold surface. Although talc powder has demonstrated satisfactory release properties, its application to a mold surface is cumbersome. The application of the talc powder by dusting is not only inconvenient and wasteful, it results in nonuniform deposition over the mold surface, creates a health hazard and precludes the use of liquid additives.

Thus, the search for release agents which will allow for the easy production of foams to meet substantially any property specification and which will overcome the common delamination problems and yet apply readily to a mold surface continues.

DESCRIPTION OF THE INVENTION

It has now been discovered that the problems encountered by the prior art can be easily and readily overcome by utilizing an external release agent broadly comprising a stable suspension of talc powder in a stable emulsion of water and an organic solvent. The suspension of the instant invention combines the desirable release properties of the talc powder and the advantages inherent to fluid release agents.

More particularly, the instant invention is directed to a mold release composition and the use thereof, said composition comprising a stable suspension of
  (A) an oil-in-water emulsion prepared by mixing
    (i) water
    (ii) an organic material which is immiscible in water, which contains no groups reactive with isocyanate groups, which is non-reactive with itself or with other components of said suspension, and which has a molecular weight of 200 or less, and
    (iii) from 3 to 10 percent by weight, based on plus (ii), of an emulsifying agent,
wherein the weight ratio of (i) to (ii) is from 1:1 to 4:1, and preferably is 2:1
  (B) a talc powder, the weight ratio of (B) to (A) being from 1:5 to 3:1, and preferably being 1:3;
  (C) an organic solvent which is miscible with said organic material, which is non-reactive with isocyanates, which is non-reactive with itself or with other components of said suspension, and which has a molecular weight of 200 or less, the weight ratio of (C) to (A) + (B) being from 15:1 to 1:1, and preferably from 1:1 to 3:1, and
  (D) from 0 to 10 percent by weight, and preferably, from 1 to 5 percent by weight, based on the total weight of (A) + (B) + (C) of a metallic compound which promotes or catalyzes the reaction between active hydrogen containing materials and isocyanate groups,
with the further proviso that component (B) comprises from 1 to 20 percent by weight of (A) + (B) + (C) + (D).

The organic solvent is used to further facilitate the application of the talc containing suspension to mold surfaces and is used to reduce the viscosity and surface tension of the suspension.

According to the present invention, it may also be desirable to add to the suspension a metallic catalyst which promotes the reaction between polyisocyanates and active hydrogen coating materials.

The promotors or catalysts useful in the instant invention are preferably selected so as to be soluble in the organic phase although such solubility is not essential. These compounds are metallic compounds which promote or catalyze the reaction between isocyanate groups and active hydrogens. These promotors or catalysts are well known in the polyurethane art and include compounds of tin, lead, cobalt, zinc, bismuth, antimony and the like. These compounds are known and are disclosed, for example, in "Polyurethanes: Chemistry and Technology," Vol. 1, pages 129–217; U.S. Patents 3,392,128; 3,392,153; 3,240,730; 3,267,047 and 3,324,054; and "Journal of Applied Polymer Science," Vol. IV, Issue # 11, pp. 207–211, all the disclosures of which are herein incorporated by reference. The presently preferred catalyst is dibutyl tin dilaurate.

Essentially, any kind of talc powder may be used to obtain the benefits of the instant invention. Talc powders are known and recognized as such in the prior art. A more detailed description of the various types of talc powders usable may be found in "Encyclopedia of Chemical Technology," Volume XIII, 1954, pages 566–572 (cf. talcum powder), the disclosure of which is herein incorporated by reference.

The organic material (ii) may be any organic material which is immiscible in water, is not reactive with isocyanate groups, is nonreactive with itself or other components of the suspension at mold temperatures and has a molecular weight of not more than about 200. According to the invention, suitable materials may be, but are not limited to, materials which are aliphatic, cycloaliphatic, aromatic, alkylaromatic, and heterocyclic and mixtures thereof. Suitable materials include but are not limited to $C_1$-$C_{14}$ hydrocarbons, single and multicyclic aromatics which may be alkyl substituted, and heterocyclic compounds containing nitrogen, oxygen and sulphur. The organic materials of the present invention may also contain non-polar functional groups. Suitable organic materials are illustrated in the following non-limiting examples: Benzene, n-butylchloride, carbontetrachloride, chloroform, cyclohexane, ethylenechloride, ethylether, n-hexane, methylenechloride, n-pentane, propylenechloride, tetrahydrofuran, toluene and trichloroethylene. The presently preferred material is toluene.

According to the present invention, any suitable emulsifying agent may be used which will promote the emulsification of the above organic materials in water. The emulsifying agents may be either ionic or non-ionic and may be used separately or in combination. Suitable emulsifiers include but are not limited to sulphonated oils, metal salts of fatty acids, organic sulphonates, fatty alcohol sulphates, long chain quaternary ammonium salts, alkoxylated fatty alcohols and the like. Non-limiting examples of useful commercial emulsifiers include any of the emulsifiers found in "Encyclopedia of Chemical Technology," Volume XIII, 1954, pages 513–536, the disclosure of which is herein incorporated by reference. The preferred emulsifying agents include sodium oleate, and sodium laurylsulphate.

According to the present invention, it is preferred to use the emulsifying agents in sufficient quantities so that the emulsifiers will not only aid in the formation of a stable dispersion, but will also aid in the mold release. It has been found that the use of emulsifiers in quantities noted hereinbefore not only promotes the emulsification of the water and organic material but reduces the energy required for demolding.

The stable dispersions of the present invention additionally include a relatively low boiling organic solvent. The organic solvent must be low boiling, miscible with the organic material (ii), non-reactive with isocyanates and non-reactive with itself or components of the suspension at mold temperatures and has a molecular weight of 200 or less. The organic solvent may be the same or different from the organic material (ii) used to form the emulsion. The preferred organic solvents are chlorinated and non-chlorinated hydrocarbons, and most preferably dichloromethane.

In general, the suspensions of the instant invention are prepared by first preparing the oil-in-water emulsion (by merely mixing the components) and thereafter adding the talc with agitation. The remaining components are then mixed until the suspension is formed. The suspension of the invention have been found to be stable indefinitely.

The mold release composition of the present invention may be applied to the mold surface by conventional means, such as spraying. After spray coating the mold surface and allowing for evaporation of the volatile components a uniform deposit of talc and other non-volatile components is formed. The polyurethane moldings are then prepared in a known manner by introducing a foamable reaction mixture comprising a polyisocyanate, a compound containing at least 2 hydrogen atoms reactive with isocyanates and additives into a closed heatable mold in which the foam expands and solidifies under compression. Any release agent which sticks to either the mold or the molding may be readily washed off with warm water.

The foam compositions which may be used to make moldings according to the invention may be any polyurethane foam forming materials. Generally, the foam compositions are made by reacting an organic diisocyanate or polyisocyanate with an organic compound which contains 2 or more hydrogen atoms which are reactive with isocyanate groups.

According to the invention, it is possible to use a polyisocyanate of any kind, preferably diisocyanates, such as, for example, tetramethylene diisocyanate, hexamethylene diisocyanate, m-xylylene diisocyanate, p-xylylene diisocyanate, 4,4'-dimethyl-1,3-xylylene diisocyanate, cyclohexane-1,4-diisocyanate, dicyclohexyl methane-4,4'-diisocyanate, m-phenylene diisocyanate, p-phenylene diisocyanate, 1-alkyl benzene-2,4- and 2,6-diisocyanate, 3-(α-isocyanatoethyl)-phenyl isocyanate, 1-benzyl-benzene-2,6-diisocyanate, 2,6-diethyl-benzene-1,4-diisocyanate, diphenylmethane-4,4'-diisocyanate, 3,3'-dimethoxy-diphenyl-methane-4,4'-diisocyanate, naphthylene-1,5-diisocyanate and the like. It is also possible to use trifunctional or polyfunctional polyisocyanates, for example, toluene-2,4,6-triisocyanate or polymethylene polyphenyl polyisocyanate obtained by phosgenation of the aniline-formaldehyde condensation product.

It is also possible to use isocyanates of the kind containing carbodiimide groups, uretdione groups, uretone imine groups, biuret groups or isocyanurate groups. Mixtures of the aforementioned isocyanates may also be used. It is also possible to use reaction products of polyhydric alcohols with polyisocyanates, and also polyisocyanates of the kind used, for example, in accordance with German Patent Specification Nos. 1,022,789 and 1,027,394.

In the present context, compounds containing at least two hydrogen atoms reactive with isocyanates preferably include polyhydroxyl compounds or polyamines. These compounds preferably have molecular weights of from about 500 to about 10,000 and most preferably from about 800 to about 5000.

Suitable active hydrogen-containing compounds include, for example, linear or branched polyesters or polyester amides which are obtained by known methods from mono- or polyfunctional alcohols and carboxylic acids or hydroxy carboxylic acids, optionally in the presence of amino alcohols, diamines, hydroxy-amines or amino carboxylic acids and which may also contain hetero atoms, double bonds and triple bonds and modifying radicals of unsaturated or saturated fatty acids or fatty alcohols. Other suitable compounds include linear polyalkylene glycol ethers of varying molecular weights obtained by polymerizing alkylene oxides, diethylene oxide, propylene oxide, styrene oxide, epichlorohydrin or tetrahydrofuran, and preferably those with a hydroxyl group content of from about 0.5 percent to about 18 percent. It is also possible to use copolymers. In this way, the properties of the end products are often remarkably modified. Linear or branched addition products obtained by addition of the aforementioned alkylene oxides with, for example, polyfunctional alcohols, amino alcohols or amines, are also suitable. The following are examples of polyfunctional starting components for the addition of the alkylene oxides: water, ethylene glycol, 1,2-propylene glycol, trimethylol propane, 1,2,4-butane triol, glycerol, pentaerythritol sorbitol and oligosaccharides and their aqueous solutions, polysaccharides, castor oil, ethanolamine, diethanolamine, triethanolamine, aniline, arylene diamines, alkylene diamines of the ethylene diamines, tetra or hexaethylene diamine type, and ammonia. It is, of course, also possible to use mixtures of linear and/or branched polyalkylene glycol ethers of different types. These polyalkylene glycol ethers may also be used in admixture with other hydroxyl compounds or amines, for example, in admixture with 1,4-butylene glycol, trimethylol propane, glycerol, 2,3-butylene glycol, pentaerythritol, tartaric acid esters, castor oil or tall oil. Foaming of the polyalkylene glycol ethers may also be carried out in mixtures with polyesters. For example, it is possible to use OH-group-containing polycarbonates, polyacetals, polyamides, polylactones or polylactams; Cl or OH-group-containing polytetrahydrofurans or polybutadiones. OH- and/or SH-group-containing polythioethers, phenol reacted with alkylene oxide, formaldehyde resins, hydrogenation products of ethylene-olefin-carbon monoxide copolymers and epoxy resins, amino-group-containing compounds, such as amino polyethers, polyesters or polyurethanes, and compounds containing carboxyl groups and/or cyclic anhydride groups, which in addition may contain ether, ester, amide, urea, urethane or thioether groups, are further examples of suitable compounds which react with isocyanates.

In addition to fillers, dyes and other such additives, it is also possible to use flame-retarding additives, which may contain groups reactive with isocyanates, such as, for example, reaction products of phosphoric acid or phosphorous acid or phosphonic acids and alkylene oxides or alkylene glycols and the like. Reaction products of dialkyl phosphites, formaldehyde and dialkanolamines, and also flame-retarding agents which do not contain any groups reactive with isocyanates, for example, tris-2-chloroethyl phosphate, tricresyl phosphate, and tris-dibromopropyl phosphate may also be employed.

As is known in the art, water and/or organic compounds, such as, trichloromonofluoromethane, dichlorofluoromethane, and methylene chloride can be used as blowing agents.

By utilizing the release agents of the instant invention, foams can be readily produced which will meet any property specification. Additionally, the delamination of the integral skin is substantially eliminated by the use of the release agents herein.

The invention is further illustrated by the following examples in which all parts and percentages are by weight unless otherwise specified. The talc powders used were either Johnson's Baby Powder (JBP), or a talc known as MISTRON VAPOR which has the following composition:

| | |
|---|---|
| $SiO_2$ | 62% |
| $CaO$ | 1% |
| $Al_2O_3$ | Trace |
| $Mgo$ | 31% |
| $Fe_2O_3$ | 1% |
| $TiO_2$ | Trace |
| $H_2O$ | 5% |

EXAMPLES

EXAMPLES 1 THROUGH 13

Water, toluene and the emulsifying agent were mixed in the proportions shown in Table 1 to form the oil-in-water emulsion. The talc indicated was then added in the amounts shown in the table and was stirred with an air driven agitator. The organic solvent and catalyst (when used) was then combined. Table 1 lists the parts by weight of each component together with a characterization of the resultant emulsion.

TABLE 1

| EXAMPLE No. INGREDIENT | 1 | 2 | 3 | 4 | 5 | 6 | 7 | 8 | 9 | 10 | 11 | 12 | 13 |
|---|---|---|---|---|---|---|---|---|---|---|---|---|---|
| Talc-JBP | 10 | 10 | 10 | 50 | 12 | — | — | — | — | — | — | — | — |
| Talc-Mistron Vapor | — | — | — | — | — | 56 | 100 | 100 | 100 | 100 | 100 | 100 | 100 |
| $H_2O$ | 10 | 10 | 10 | 10 | 14 | 132 | 150 | 200 | 250 | 80 | 200 | 200 | 200 |
| Toluene | 10 | 10 | 10 | 10 | 12 | 112 | 100 | 100 | 100 | 60 | 100 | 100 | 100 |
| $CH_2Cl_2$ | 68 | 468 | 468 | 375 | 77 | 360 | 640 | 570 | 500 | 656 | 470 | 475 | 475 |
| Emulsifier 1* | 2 | 2 | 2 | 2 | 1 | 9.2 | — | — | — | 6 | — | — | — |
| Emulsifier 2*[1] | — | — | — | — | — | 28 | 10 | 30 | 50 | — | 30 | 25 | 25 |
| Dibutyl tin Dilaurate | — | — | 75 | 50 | — | — | — | — | — | 100 | 100 | 100 | — |
| Dibutyl Tin Dichloride | — | — | — | — | 12 | — | — | — | — | — | — | — | — |
| Dimethyl Tin Mercaptide | — | — | — | — | — | — | — | — | — | — | — | — | 100 |
| Suspension*[2] | S | S | S | S | S | S | S | S | S | S | S | S | S |

*Emulsifier 1 is a 33 percent solution of sodium lauryl sulphate in water.
*[1]Emulsifier 2 is sodium oleate.
*[2]S = Stable.

EXAMPLE 14

A two-component reaction mixture was prepared as follows:

Component A — a polyol blend and was prepared by blending
 (a) 79 parts of a polyether polyol having an average OH number of about 30 and an average functionality of about 2,
 (b) 15.4 parts of ethylene glycol, and
 (c) about 5 parts of a blend of water, triethylene diamine, dibutyl tin dilaurate methylene chloride, a catalyst (PU-1815 product of Bayer AG) and a silicon lubricant (L-5303 product of Union Carbide).

Component B — a modified 4,4'-diphenyl-methane diisocyanate having an NCO content of about 30% by weight (MONDUR PF).

To observe the buildup of mold release agent and the ease of release during repeated use of the mold, four moldings of the above reaction mixture was made. A 6 × 6 × ⅛" aluminum mold was heated to a temperature of about 130° F. The mold was sprayed with the suspension of Example 8. 100 parts of component A and 90 parts of component B were then mixed and stirred for 5 seconds and immediately poured into the open mold. The mold was then clamped shut. The resultant product was demolded about 1½ minutes after the mixture was poured into the mold. Four successive moldings were made with application of the mold release before each molding and without manual wipping of the mold surface. Good release was observed at each time.

EXAMPLE 15

The procedure of Example 14 was repeated except the mold release agent of Example 7 was used. After four successive moldings, it was observed that the force required to release the molding from the mold was greater than that observed in Example 14, but that excellent release was obtained with no buildup of the oleate on the mold surface. It was concluded that for the purposes of reducing the buildup of mold release agent on the mold surface, the concentration of the sodium oleate in Example 7 was preferable to the concentration of the sodium oleate in Example 8.

EXAMPLE 16

The procedure of Example 14 was repeated except the mold release agent of Example 2 was used. The mold release agent was sprayed to give a uniform coat and released well upon demolding of the part from the mold.

EXAMPLE 17

A nickel plated placque mold was heated to a temperature of 140° F. A Binks spray gun was then used to spray the release composition of Example 13 onto the mold. 100 parts of component A and 90 parts of Component B of Example 14 at a temperature of 90° F. were then mixed and stirred for 5 seconds and immediately poured into the mold. The mold was then clamped shut. The resultant product was then demolded 1 minute after the reaction mixture was poured into the mold. No skin delamination was noted. Five consecutive moldings were made. Before each molding, the mold release agent of Example 13 was applied to the mold. A minimal coat was applied each time. After five moldings, no buildup of polyurethane was observed on the mold surface. A very light coat of residual mold release agent remained on the mold, but essentially, all of the mold release agent had adhered to the part.

EXAMPLE 18

The procedure of Example 14 was followed except the mold release agent was the release agent described in Example 13. Mold release was excellent.

EXAMPLE 19

A Monza headlight mold was heated to a temperature of about 130° F. The mold release agent of Example 12 was then sprayed onto the mold. 100 parts of Component A and 90 parts of component B of Example 14 were then mixed and stirred for 5 seconds and immediately poured into the open mold. Extremely good release properties were observed. Five consecutive moldings were made with application of the mold release agent before each molding. Excellent release characteristics were observed, but one part stuck to the mold surface due to an incomplete coat of the release agent on the surface.

EXAMPLE 20

A placque mold was heated to a temperature of 140° F. The mold release agent of Example 11 was sprayed onto the mold. 100 parts of component A and 90 parts of component B of Example 22 were then mixed and stirred for 5 seconds and immediately poured into the open mold. The mold was then clamped shut. Upon removal of the molding, the mold surface was inspected and was found not to be perfectly clean. Nine additional moldings were made with application of the mold release agent before each molding. No polyurethane buildup was observed on the mold. A buildup of the release coating composition was observed on the mold, but the buildup was no worse than that observed after the second or third molding.

EXAMPLE 21

A very light coat of the mold release agent in Example 10 was applied to a mold surface. The reactive mixture of Example 14 was then poured into the open mold, and the mold was then clamped shut. The resultant product was very difficult to demold, but the mold was completely clean. The procedure was repeated with a heavier coat of the release agent applied to the mold surface. The molding released early, but the mold needed to be cleaned. There was much buildup on the mold surface and the skin of the molding was sticky. The procedure was again repeated with a very light application of the release agent. The part demolded easily and the mold surface was clean. The procedure was repeated two additional times with light coats applied each time and good mold release was observed with no deposit of polyurethane on the surface of the mold.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A mold release composition comprising a stable suspension of
    (A) an oil-in-water emulsion prepared by mixing
        (i) water
        (ii) an organic material which is immiscible in water, which contains no groups reactive with isocyanate groups, which is non-reactive with itself or with other components of said suspension, and which has a molecular weight of 200 or less, and
        (iii) from 3 to 10 percent by weight, based on (i) plus (ii), of an emulsifying agent,
    wherein the weight ratio of (i) to (ii) is from 1:1 to 4:1;
    (B) a talc powder, the weight ratio of (B) to (A) being from 1:5 to 3:1;
    (C) an organic solvent which is miscible with said organic material, which is non-reactive with isocyanates, which is non-reactive with itself or with other components of said suspension, and which has a molecular weight of 200 or less, the weight ratio of (C) to (A) + (B) being from 15:1 to 1:1, and
    (D) from 0 to 10 percent by weight based on the total weight of (A) + (B) + (C) of a metallic compound which promotes or catalyzes the reaction between active hydrogen containing materials and isocyanate groups, with the further proviso that component (B) comprises from 1 to 20 percent by weight of (A) + (B) + (C) + (D).

2. The mold release composition of claim 1 wherein the weight ratio of (i) to (ii) is 2:1, wherein the weight ratio of (B) to (A) is 1:3, wherein the weight ratio of (C) to (A) + (B) is from 1:1 to 3:1, and wherein the metallic compound comprises from 1 to 5 percent by weight.

3. The mold release composition of claim 2 wherein the organic material is toluene, the emulsifying agent is sodium oleate, the organic solvent is dichloromethane and the metallic compound is dibutyl tin dichloride.

4. In a method of molding a polyurethane foam in a closed mold comprising applying a release composition to the mold surface, injecting polyurethane forming materials into the mold and thereafter allowing said polyurethane to foam, the improvement wherein the mold release composition comprises a stable suspension of (A) an oil-in-water emulsion prepared by mixing
  (i) water
  (ii) an organic material which is immiscible in water, which contains no groups reactive with isocyanate groups, which is non-reactive with itself or with other components of said suspension, and which has a molecular weight of 200 or less, and
  (iii) from 3 to 10 percent by weight, based on (i) plus (ii), of an emulsifying agent,
wherein the weight ratio of (i) to (ii) is from 1:1 to 4:1;
(B) a talc powder, the weight ratio of (B) to (A) being from 1:5 to 3:1;
(C) an organic solvent which is miscible with said organic material, which is non-reactive with isocyanates, which is non-reactive with itself or with other components of said suspension, and which has a molecular weight of 200 or less, the weight ratio of (C) to (A) + (B) being from 15:1 to 1:1, and
(D) from 0 to 10 percent by weight based on the total weight of (A) + (B) + (C) of a metallic compound which promotes or catalyzes the reaction between active hydrogen containing materials and isocyanate groups, with the further proviso that component (B) comprises from 1 to 20 percent by weight of (A) + (B) + (C) + (D).

5. The method of claim 4 wherein the weight ratio of (i) to (ii) is 2:1, wherein the weight ratio of (B) to (A) is 1:3, wherein the weight ratio of (C) to (A) + (B) is from 1:1 to 3:1, and wherein the metallic compound comprises from 1 to 5 percent by weight.

6. The method of claim 5 wherein the organic material is toluene, the emulsifying agent is sodium oleate, the organic solvent is dichloromethane and the metallic compound is dibutyl tin dichloride.

* * * * *